(12) United States Patent
McMasters

(10) Patent No.: US 7,937,957 B2
(45) Date of Patent: May 10, 2011

(54) METHOD FOR USING HIGH PRESSURE REFRIGERANT FOR LEAK CHECKING A SYSTEM

(75) Inventor: Mark William McMasters, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 412 days.

(21) Appl. No.: 12/115,338

(22) Filed: May 5, 2008

(65) Prior Publication Data

US 2009/0272131 A1 Nov. 5, 2009

(51) Int. Cl.
 *F25B 45/00* (2006.01)
(52) U.S. Cl. ............................ 62/77; 62/126; 62/149
(58) Field of Classification Search ............. 62/77, 126, 62/292, 149, 474, 196.4
See application file for complete search history.

(56) References Cited

U.S. PATENT DOCUMENTS

| | | | | | |
|---|---|---|---|---|---|
| 5,172,562 | A | * | 12/1992 | Manz et al. | 62/149 |
| 5,720,184 | A | * | 2/1998 | Olsen | 62/292 |
| 5,761,924 | A | * | 6/1998 | Peckjian | 62/292 |
| 6,134,896 | A | | 10/2000 | Brown et al. | |
| 6,170,541 | B1 | * | 1/2001 | Sanhaji | 141/98 |
| 6,338,255 | B1 | * | 1/2002 | Richard et al. | 62/292 |
| 6,742,384 | B2 | * | 6/2004 | Avila | 73/40.7 |

* cited by examiner

*Primary Examiner* — Mohammad M Ali
(74) *Attorney, Agent, or Firm* — Baker & Hostetler LLP

(57) ABSTRACT

A method for using refrigerant to check for a leak in a refrigerant system is provided that establishing fluid communication between a refrigerant recovery unit and a refrigerant system. The refrigerant recovery unit passes a refrigerant through the refrigerant recovery unit, compresses the refrigerant utilizing the refrigerant recovery unit, and transfers the compressed refrigerant from the refrigerant recovery unit directly into the refrigerant system. Additional refrigerant is added into the refrigerant system until a desired system pressure is reached, and then the refrigerant system is checked for leaks.

16 Claims, 4 Drawing Sheets

METHOD FOR USING HIGH PRESSURE REFRIGERANT FOR LEAK CHECKING A SYSTEM

FIELD OF THE INVENTION

The disclosure relates generally to automotive vehicle air conditioning systems, and more specifically to refrigerant recovery units that can be utilized to check for leaks in the vehicle's air conditioning system.

BACKGROUND OF THE INVENTION

Portable refrigerant recovery units or carts are used in connection with the service and maintenance of refrigeration systems including an automotive vehicle's air conditioning system. The refrigerant recovery unit connects to the air conditioning system of the automotive vehicle to recover refrigerant out of the system, separate out oil and contaminants, and recharge the system with additional refrigerant.

Over time, the air conditioning system may develops leaks, both large and small. Therefore, equipment is needed to check for these leaks. Leaking refrigerant not only reduces the amount of refrigerant available in the refrigerant system for cooling, but also contributes to greenhouse gas emissions into the atmosphere. While previous methods to check for leaks have employed introducing a variety of gases such as nitrogen into the refrigeration system, these methods require separate equipment apart from the refrigerant recovery unit, and thus are not an efficient use of equipment or service time.

SUMMARY OF THE INVENTION

At least one embodiment of the disclosure provides a method for using refrigerant to check for a leak in a refrigerant system that includes establishing fluid communication between a refrigerant recovery unit and a refrigerant system; passing a refrigerant through the refrigerant recovery unit; compressing the refrigerant utilizing the refrigerant recovery unit; transferring the compressed refrigerant from the refrigerant recovery unit directly into the refrigerant system; pressurizing the refrigerant system to a predetermined pressure; and checking the refrigerant system for a refrigerant leak.

Other embodiments provide a method for a refrigerant recovery unit that places high pressure refrigerant into a refrigeration system to test for refrigerant leaks, that includes a recovery circuit including a compressor configured to be coupled to a refrigerant system and to draw a refrigerant through the compressor; a controller in communication with the recovery circuit for controlling a transfer of the refrigerant through the compressor and for putting the compressed refrigerant into the refrigerant system; and a diversion circuit operatively engaged with said recovery circuit and said controller and operable to transfer the refrigerant from the compressor to the refrigerant system.

Still other embodiments provide a refrigerant recovery unit that places high pressure refrigerant into a refrigeration system to test for refrigerant leaks, that includes a fluid transfer means including a fluid compressing means configured to be coupled to a refrigerant system and to move a refrigerant through the fluid compressing means; and a controller in communication with the fluid transfer means for controlling a transfer of the refrigerant through the fluid compressing means and for putting the refrigerant received from the fluid compressing means directly into the refrigerant system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
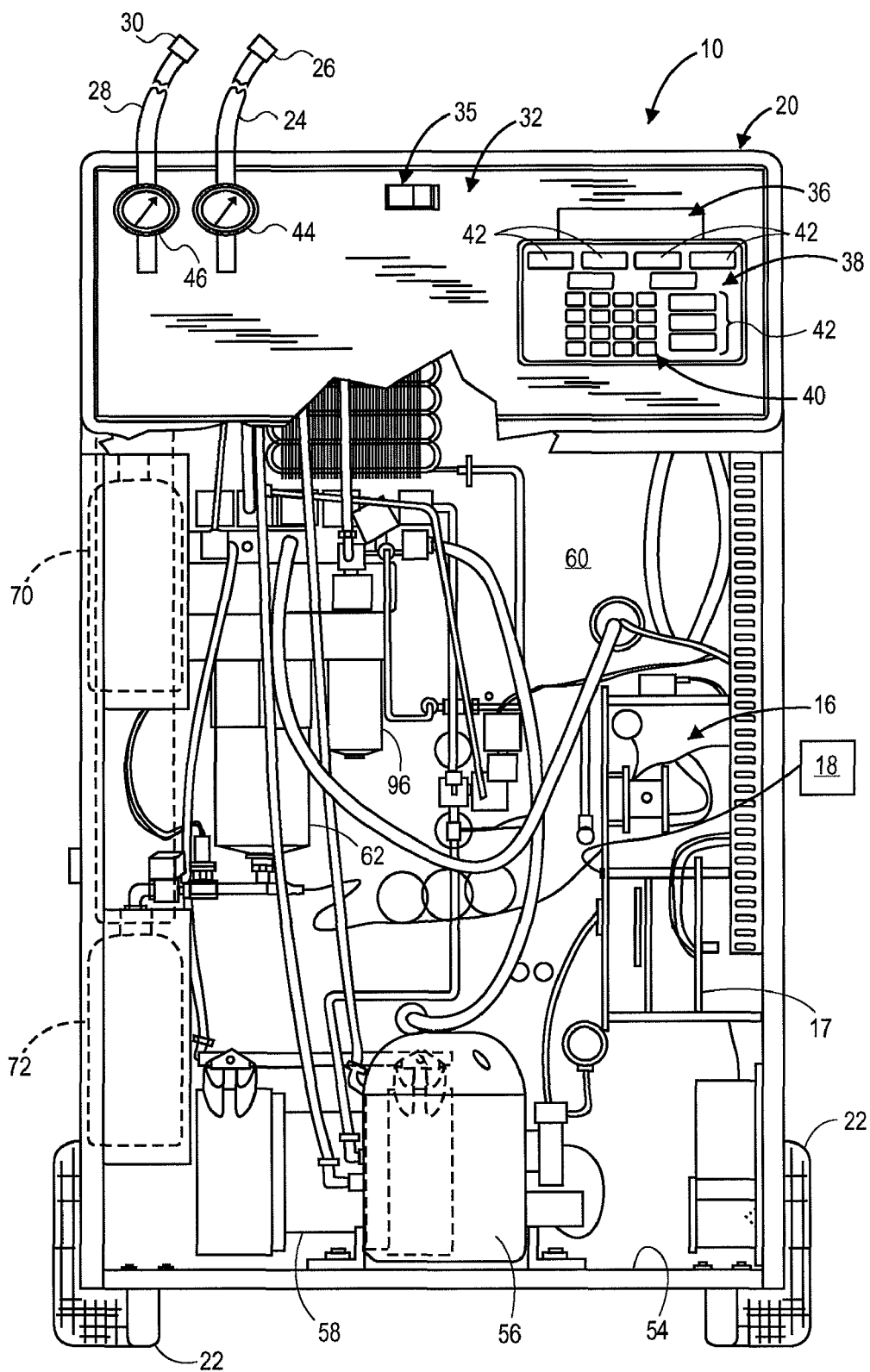
FIG. 1 is a fragmentary front plan view of an example refrigerant recovery unit shown with a portion of the front cover removed to illustrate major components of the unit according to an embodiment of the invention.
Figure 2:
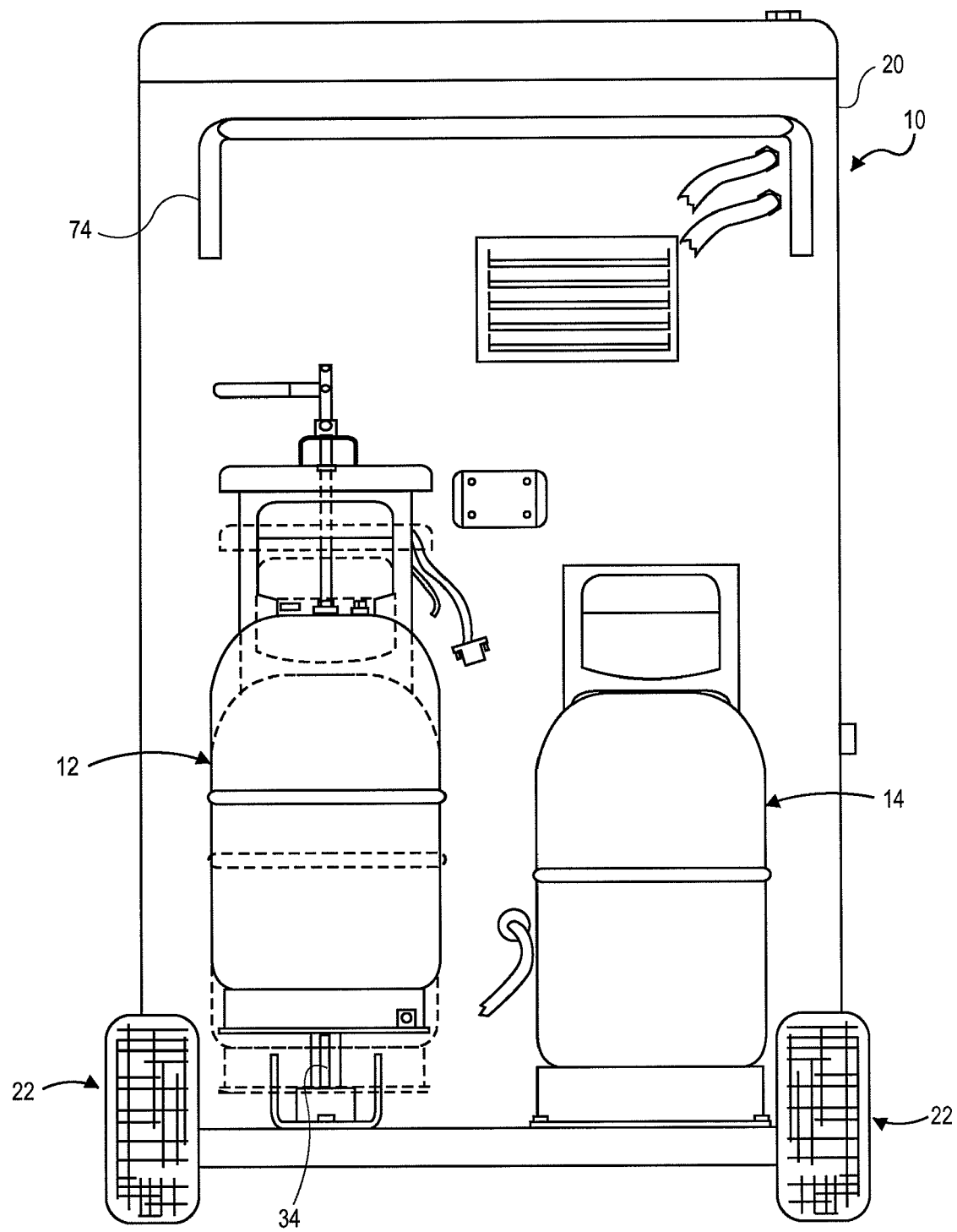
FIG. 2 is a fragmentary rear plan view of the refrigerant recovery unit shown in FIG. 1 according to an embodiment of the invention.
Figure 3:
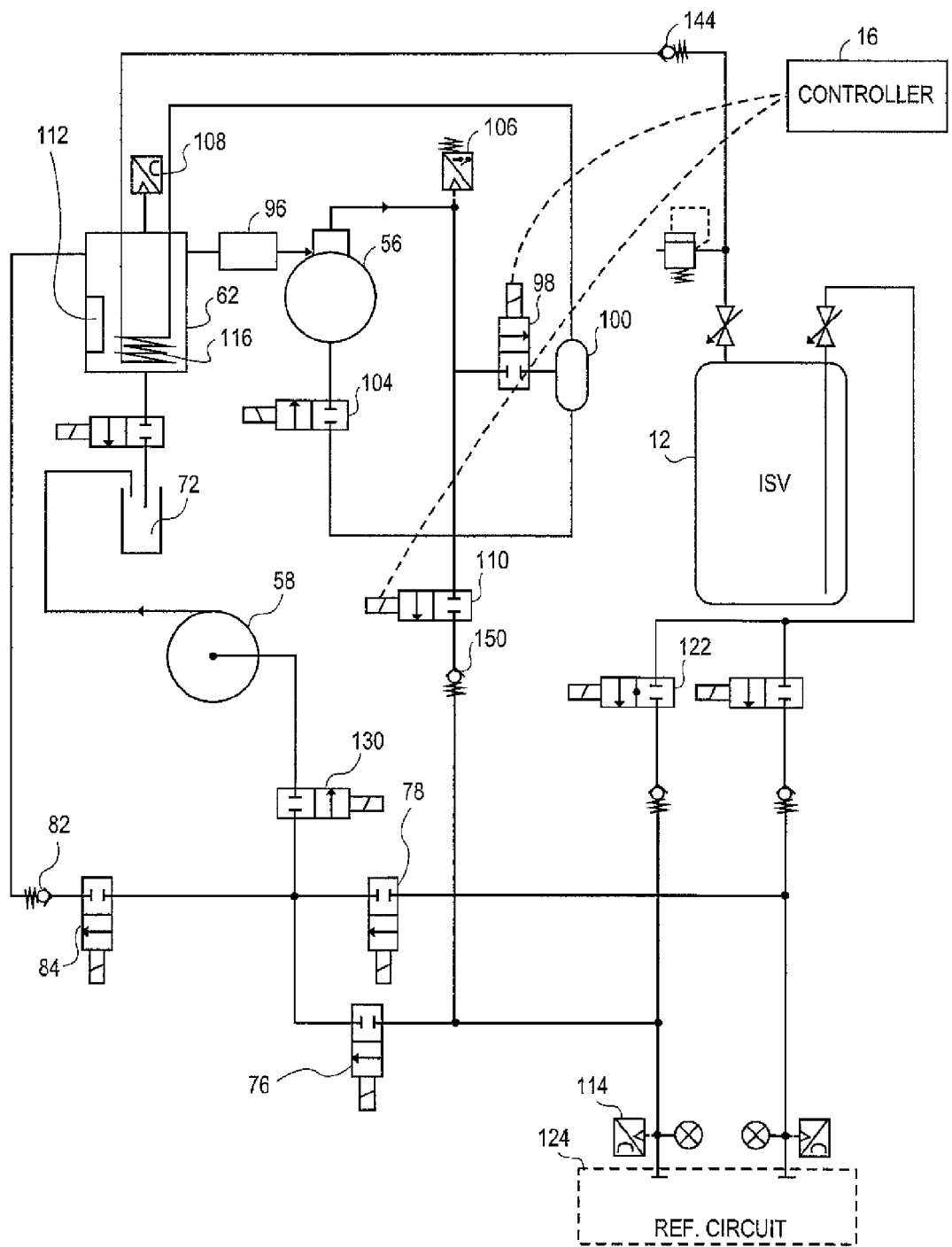
FIG. 3 is a flow diagram of the refrigerant recovery unit shown in FIGS. 1 and 2 according to an embodiment of the invention.

The invention will now be described with reference to the drawing figures, in which like numerals refer to like parts throughout. FIGS. 1-2 generally show one example of a portable recovery unit 10 for recovering and recycling refrigerant from a refrigerant system, such as in an automotive vehicle. The refrigerant recovery unit 10 is a machine mounted within a cabinet 20 supported by a pair of wheels 22, for portability. The unit 10 includes a first container or main tank 12 for holding a primary supply of refrigerant. The main tank 12 may also be referred to as an internal storage vessel (ISV). The primary supply of refrigerant or recovered refrigerant contains refrigerant that has been recovered from the air conditioning system. The unit 10 also includes a second container or auxiliary tank 14 for holding a secondary supply of refrigerant. The secondary supply of refrigerant has a known chemical composition, and is sometimes referred to as fresh refrigerant, virgin refrigerant or recharging refrigerant. The auxiliary tank 14 is arranged to be in fluid communication with the main tank 12 so that fresh refrigerant can be transferred from the auxiliary tank 14 to the main tank 12 as needed. An electronic controller 16 controls the transfer of refrigerant from the auxiliary tank 14 to the main tank 12 and between the main tank 12 and a refrigeration system 124 (FIG. 3).

The electronic controller 16 includes a microprocessor on a circuit board 17. The controller 16 controls electromechanical solenoid valves, including solenoid valves 98 and 110 (FIG. 3). The controller 16 may include a memory unit to store software and data, and the microprocessor may be coupled to the memory unit for executing the software stored in the memory unit. The electronic controller 16 receives data signals from a variety of devices and sensors including pressure sensors, temperature sensors, control switches on the control panel 32, as well as from a weighing device 34.

The weighing device 34, shown in the example embodiment, is a load cell, but the weighing device may also be any type of electronic scale or any other type of weighing device configurable to transmit a weight data signal to the controller 16. As shown in FIG. 2, the main tank 12 rests on the weighing device 34. The weighing device 34 provides a weight data signal to the controller 16 such that the weight of the tank comprising its tare weight plus the weight of refrigerant therein is monitored by the controller 16.

The control panel 32 includes an on/off switch 35 and a display 36 for displaying the operational status of the refrigerant recovery unit's operation. The display may be an LCD display or other suitable electronic display that is coupled to the controller 16 by way of a conventional input/output circuit. The control panel 32 further includes a switch panel 38 having a conventional keyboard 40, and a plurality of push-button switches 42 for controlling the operation of the unit 10 through its various phases of operation and/or for selecting parameters for display. The keyboard 40 in conjunction with operational switches 42 and display 36 allow an operator to enter the desired operational parameters for the unit 10 according to manufacturer specifications for the servicing of an air conditioning system in a particular vehicle.

The refrigerant recovery unit 10 includes a high pressure hose 24, typically color coded red, with a coupling 26 for coupling to the vehicle's high pressure port and a low pressure hose 28, typically color coded blue, having a coupling 30 for coupling to the low pressure port of the vehicle's refrigerant circuit. In some refrigerant systems, there may be only one port, for example, where the recovery or low pressure port is eliminated. In such systems, the refrigerant recovery unit may be configured with one hose, in accordance with the principles of the invention.

The front panel of the cabinet 20 is shown broken away in FIG. 1 to show the major elements of the refrigerant recovery unit 10. The input hoses 24 and 28 are coupled to mechanical pressure gauges 44 and 46, respectively, which are mounted on the front panel of refrigerant recovery unit 10, as seen in FIG. 1. In addition, electrical pressure transducers may be coupled to the hoses 24 and 28, and are coupled to the controller 16 through conventional input/output circuits to provide the controller 16 with pressure information during operation of the unit 10. Gauges 44 and 46 provide the operator with a conventional analog or digital display of the pressure as well.

Mounted to the floor 54 of cabinet 20 is a fluid compressing means or compressor 56 and a vacuum pump 58. Behind the front of cabinet 20 on floor 54, is mounted the main tank 12 of refrigerant (FIG. 2) for the supply of refrigerant to the system being serviced. Also, mounted adjacent the main tank 12 is the auxiliary supply tank 14 which supplies additional refrigerant to the main tank 12. High pressure hoses and connectors together with control valves couple tank 14 to tank 12.

Mounted to the inside of rear wall 60 of cabinet 20 is an oil separator 62 and a compressor oil separator filter 96. In addition, a fresh oil canister 70 is mounted within a side compartment of cabinet 20. A recovery oil container 72 is mounted on the lower part of the cabinet 20 to receive oil drained from the oil separator 62. Refrigerant recovery unit 10 also includes a handle 74 to facilitate portability of the refrigerant recovery unit 10.

Having briefly described the major components of the refrigerant recovery unit 10, a more detailed description of the structure and operation of the example refrigerant recovery cart 10 follows in connection with reference to FIG. 3.

With respect to a recovery process, one example of a recovery circuit or fluid transfer means is described below and shown in FIG. 3. To recover refrigerant, initially, hoses 24 and 28 (FIG. 1) are coupled to the refrigeration system 124 of a vehicle, and the recovery cycle is initiated by the opening of the dual back-to-back high pressure and low pressure solenoids 76, 78, respectively. This allows the refrigerant within the refrigeration system 124 to flow through recovery valve 84 and check valve 82. The refrigerant flows from the check valve 82 into a system oil separator 62, where it travels through a filter/dryer 96, to an input of a compressor 56. Refrigerant is drawn through the compressor 56 through a normal discharge solenoid 98 and through the compressor oil separator 100, which circulates oil back to the compressor 56, through an oil return valve 104. The refrigerant recovery unit 10 may optionally include a high pressure switch 106 in communication with the controller 16, which is programmed to determine the upper pressure limit of, for example, 435 psi, to shut down the compressor 56 to protect the compressor 56 from excessive pressure. The compressed refrigerant exits the oil separator 100 and then travels through a heating coil 112 in the system oil separator 62. Optionally, if a purging of the system is desired, a high-side clear solenoid (not shown) may be coupled to the output of the compressor 56 to release the recovered refrigerant transferred from compressor 56 directly into the main tank 12, instead of through a path through the normal discharge solenoid 98.

To continue, the heated compressed refrigerant flows through heating coil 112 and assists in maintaining a temperature in the system oil separator 62 within a working range. Optionally, the refrigerant recovery unit 10 may include a low pressure switch or pressure transducer 108, for example, coupled to the system oil separator 62 that senses pressure information and provides an output signal coupled to the microprocessor through a suitable interface circuit programmed to detect when the pressure has recovered refrigerant down to 13 inches of mercury.

The refrigerant is further transferred through a loop of conduit or heat exchanger 116, for example, associated with the system oil separator 62, for cooling or condensing. Finally, the recovered refrigerant flows through a normal discharge check valve 144 and into the main tank 12. Alternatively, if the controller 16 determines that a user has selected that the recovered refrigerant should be diverted to an external tank (not shown), the recovered refrigerant may be diverted to the external storage tank.

The evacuation cycle begins by the opening of solenoids 76 and 78 and valve 130, leading to the input of a vacuum pump 58. Prior to opening valve 130, an air intake valve (not shown) is opened, allowing the vacuum pump 58 to start up exhausting air. The vehicle system 124 is then evacuated by the closing of the air intake valve and the opening of valve 130, allowing the vacuum pump 58 to exhaust any trace gases remaining until the pressure is approximately 29 inches of mercury. When this occurs, as detected by pressure transducers optionally coupled to the high side and low side of the refrigeration system 124 and to the controller 16, the controller 16 actuates valve 130 by turning it off and the recharging cycle begins.

The recharging cycle begins by opening charge valve 122 and solenoid 76 to allow the liquid refrigerant in tank 12, which is at a pressure of approximately 70 psi or above, to flow through the high side of the refrigeration system 124. The flow is through high-pressure solenoids 76 for a period of time programmed to provide a full charge of refrigerant to the vehicle.

Figure 4:
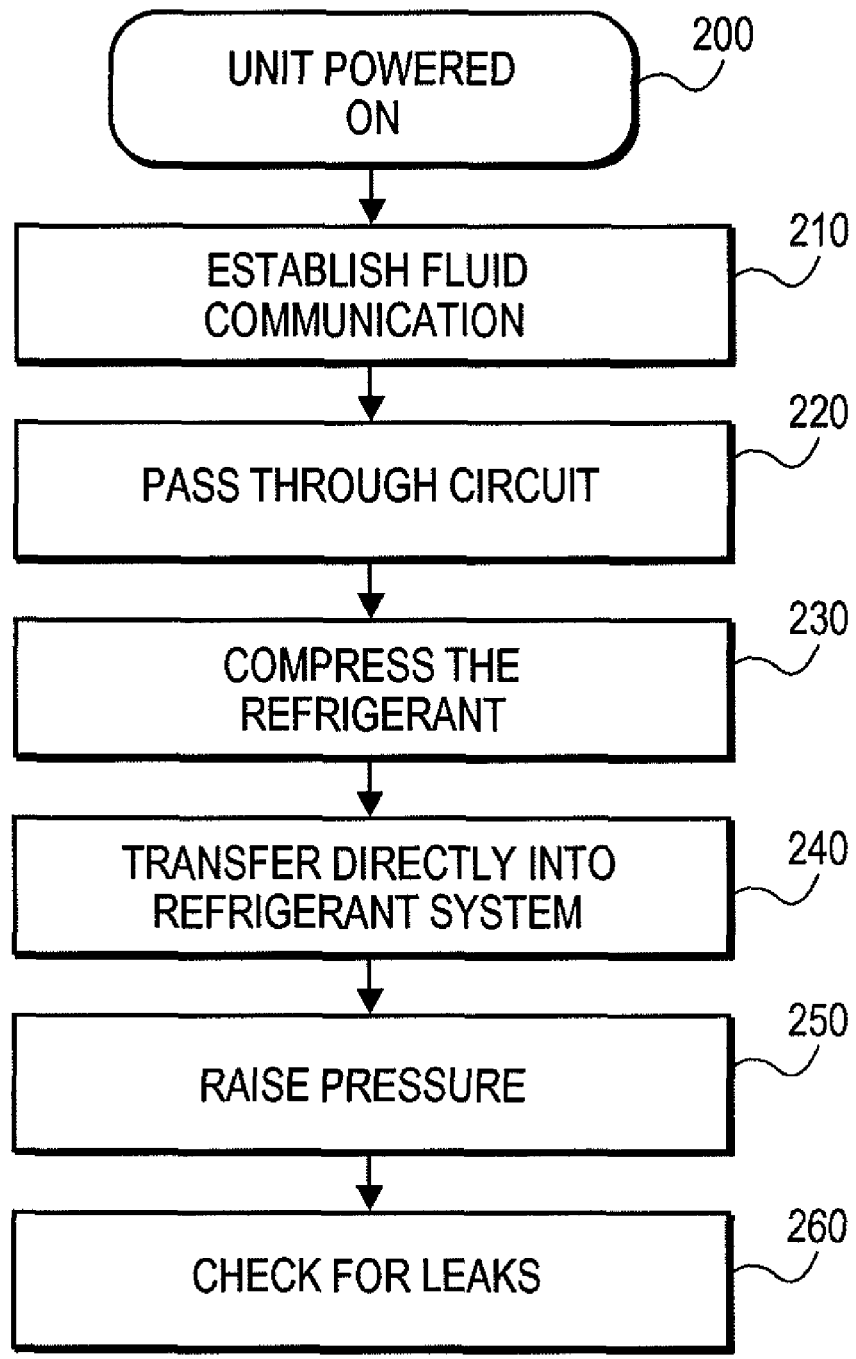
FIG. 4 is a flow chart illustrating operations that may be performed by the refrigerant recovery cart unit shown in FIGS. 1-3 according to an embodiment of the invention.

Having thus described the basic operations of the refrigerant recovery unit, the specific structure and operation of the refrigerant recovery cart 10 to discharge compressed refrigerant into a refrigeration system 124 will now be discussed with reference to FIGS. 3 and 4.

Referring to FIG. 3, the refrigerant recovery cart 10 may be provided with an optional means for diverting the compressed refrigerant leaving the compressor 56 to the high side port of the refrigerant system 124 being serviced. Specifically, the refrigerant recovery cart 10 may be provided with a diversion circuit generally consisting of a diversion valve or a high pressure leak test flow control solenoid 110 and a check valve 150. The high pressure leak test solenoid 110 is a two-way solenoid arranged in parallel with the normal discharge solenoid 98. The high pressure leak test solenoid 110 is arranged in communication with the controller 16 and configured to open and close when a corresponding signal is received from the controller 16. The high pressure leak test solenoid 110 is coupled to the recovery circuit and coupled to the compressor 56 such that flow from the compressor 56 may be received and transferred by the high pressure leak test solenoid 110, and diverted away from a heat exchanger 116.

Arranged on the side of the solenoid 110 nearest the refrigeration system 124 being serviced is the check valve 150. The check valve 150 is coupled to the high pressure leak test solenoid on one side and the refrigeration system on the other. The check valve 150 permits fluid to flow in only one direction, and receives refrigerant from the high pressure leak test solenoid 110 and transfers that refrigerant to the refrigerant system 124. The check valve 150 also ensures that during the leak test or other vehicle diagnostics, the high pressure leak test solenoid 110 is not forced open.

During normal operation of the refrigerant recovery cart 10, the high pressure leak test solenoid is closed and the normal discharge solenoid is opened. When the high pressure leak test solenoid 110 is closed, the refrigerant exiting the compressor 56 follows the normal recovery return path, continuing from the compressor 56 to the normal discharge solenoid 98, through the compressor oil separator 100, through heating coil 112 in the system oil separator 62, through the normal discharge check valve 144, to the main tank 12.

During a high pressure leak test mode of the refrigerant recovery unit 10, with the refrigerant recovery unit 10 powered on, as shown in block 200 and fluid communication established between the refrigerant recovery unit 10 and refrigeration system 124, as shown in block 210, refrigerant is circulated or passed through the refrigerant recovery unit 10, as shown in block 220 to the compressor 56. The refrigerant then moves through the compressor 56, as shown in block 230, and transfers straight from the compressor 56 directly into the refrigerant system 124, as shown in block 240. As refrigerant is added to the refrigerant system 124, the internal pressure of the refrigerant system 124 is raised, as shown in block 250. When the pressure is sufficiently raised, the refrigerant system 124 may be checked for leaks, as shown in block 260.

More specifically, during the high pressure leak test mode of the refrigerant recovery unit 10, the controller 16 operates to close the normal discharge solenoid 98 so the path through the normal discharge solenoid 98 is closed off. The high pressure leak check solenoid 110 is then actuated open by the controller 16. Thus, the refrigerant exiting the compressor 56 is permitted to flow from the compressor 56 through the high side flow control solenoid 76 to the high side port of the refrigerant system 124 being serviced.

As the refrigerant system 124 is filled with the heated, high pressure, compressed refrigerant, the pressure of the refrigerant system 124 is increased. The increasing pressure is monitored by a transducer 114 such as a pressure transducer or a temperature transducer or any other suitable device configured to sense pressure information and to communicate that pressure information to the controller 16. The transducer 114 is coupled to the refrigerant system 124 and is, for example, arranged at the inlet to the refrigerant system 124 being serviced. Refrigerant transfers from the compressor 56 and into the refrigerant system 124 until a desired system pressure in the refrigerant system 124 is reached. The desired pressure may be a predetermined pressure that is sufficient to permit finding small leaks in the system. Certain types of hose leaks and seal leaks will not show up at low pressures, but will be much more obvious at higher pressures. Thus, compressed refrigerant is transferred into the refrigerant system, until the system pressure reaches a high pressure, such as 300 psi, for example.

When the refrigerant recovery unit 10 through the controller 16 detects that the desired pressure in the refrigerant system 124 is at the desired or predetermined pressure, the controller 16 acts to shut off the compressor 56 and close the high pressure leak check solenoid 110. At this point, the pressure in the refrigerant system 124 is sufficiently high so that the refrigerant system may be checked for leaks.

To check for leaks in the refrigerant system 124, a refrigerant detector or refrigerant identifier 18 configured to sense the refrigerant escaping or leaking from the system 124 is used. The refrigerant identifier may be a known electronic refrigerant identifier or any other suitable device for sensing escaping refrigerant.

As the refrigerant system 124 is checked for leaks, the refrigerant in the refrigerant system 124 may begin to cool. The controller 16 which is in communication with the transducer 114 sensing the pressure information will detect the decreasing pressure associated with the cooling refrigerant. Thus, the controller 16 which is monitoring the pressure in the refrigerant system 124 will act to control the pressure within the refrigerant system 124 so that a constant pressure is maintained in the system 124 during the leak check. If the controller 16 determines that the pressure is decreasing from the desired pressure level, the controller 16 operates to turn on the compressor 56, and open the high pressure leak test solenoid 110, allowing additional compressed refrigerant to flow into the refrigerant system 124. When the pressure in the refrigerant system 124 is sufficiently increased, the controller 16 would then act to shut off the compressor 56 again, and to close the higher pressure leak test solenoid 110. This process repeats as necessary to maintain a relatively constant pressure in the refrigerant system 124 during the system leak check.

When the leak check test is finished, the refrigerant remaining in the refrigerant system may then be withdrawn out of the system 124 again by the recovery circuit of the refrigerant recovery unit 10.

Thus, with the system of the present invention, a refrigerant recovery unit 10 is provided that is useful for discovering small refrigerant leaks in an air conditioning system, such as that in an automotive vehicle when the vehicle engine is shut off.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for using refrigerant to check for a leak in a refrigerant system, comprising:
 establishing a fluid communication between a refrigerant recovery unit and the refrigerant system;
 passing a refrigerant through the refrigerant recovery unit;
 compressing the refrigerant utilizing the refrigerant recovery unit;
 diverting the compressed refrigerant leaving a compressor away from a heat exchanger;
 transferring the compressed refrigerant from the refrigerant recovery unit directly into the refrigerant system;
 pressurizing the refrigerant system to a predetermined pressure; and
 checking the refrigerant system for a refrigerant leak.

2. The method according to claim 1, further comprising sensing the refrigerant leak in the refrigerant system.

3. The method according to claim 1, wherein said passing further comprises receiving refrigerant withdrawn from the refrigerant system and circulating the withdrawn refrigerant through the refrigerant recovery unit.

4. The method according to claim 1, wherein said passing further comprises receiving a supplied refrigerant from a supply tank located in the refrigerant recovery unit and circulating the supplied refrigerant through the refrigerant recovery unit.

5. The method according to claim 1, wherein said diverting further comprises actuating a valve to divert the compressed refrigerant from reaching the heat exchanger and directly into the refrigerant system.

6. The method according to claim 1, further comprising diverting the compressed refrigerant into the refrigerant system while the compressed refrigerant remains in a high pressure vapor state.

7. The method according to claim 1, wherein said transferring further comprises adding additional compressed refrigerant into the refrigerant system until the predetermined pressure of the refrigerant system is reached.

8. The method according to claim 7, wherein said adding continues until the predetermined pressure is increased to about 300 psi.

9. The method according to claim 7, further comprising stopping the transfer of compressed refrigerant into the refrigerant system when the predetermined pressure is reached.

10. The method according to claim 9, further comprising maintaining the predetermined pressure while the refrigerant system is checked for the refrigerant leak.

11. The method according to claim 1 further comprising detecting the refrigerant leak with a refrigerant leak detector.

12. A refrigerant recovery unit that places high pressure refrigerant into a refrigerant system to test for refrigerant leaks, comprising:
 a recovery circuit including a compressor configured to be coupled to the refrigerant system and to draw a refrigerant through the compressor;
 a controller in communication with the recovery circuit for controlling a transfer of the refrigerant through the compressor and for putting the compressed refrigerant into the refrigerant system; and
 a diversion circuit operatively engaged with said recovery circuit and said controller and operable to transfer the compressed refrigerant from the compressor to the refrigerant system, wherein said diversion circuit includes a diversion valve operable between an open position and a closed position by said controller and operatively engaged with the diversion circuit so that when said diversion valve is in the open position thereof, the compressed refrigerant flows from the compressor to the refrigeration system, and when said diversion valve is in the closed position thereof, the compressed refrigerant is prevented from flowing from the compressor to the refrigeration system.

13. The refrigerant recovery unit according to claim 12, wherein said diversion valve is a solenoid actuated valve.

14. The refrigerant recovery unit according to claim 12, wherein said recovery circuit is configured to withdraw refrigerant out of the refrigerant system and to pass said withdrawn refrigerant through the compressor and transfer the compressed refrigerant directly from the compressor into the refrigerant system.

15. The refrigerant recovery unit according to claim 12, wherein said recovery circuit is operably connected to an internal storage vessel containing the refrigerant, and wherein the refrigerant is circulated through the compressor and passed from the compressor directly into the refrigerant system.

16. A refrigerant recovery unit that places high pressure refrigerant into a refrigeration system to test for refrigerant leaks, comprising:
 a means for transferring fluid including a means for compressing fluid configured to be coupled to the refrigerant system and to move a refrigerant through the means for compressing fluid;
 a means for controlling configured to be in communication with the means for transferring fluid and controlling a transfer of the refrigerant through the means for compressing fluid and for putting the refrigerant received from the means for compressing fluid directly into the refrigerant system; and
 a means for diverting configured for diverting the refrigerant received from the means for compressing fluid directly to the refrigerant system, wherein said means for diverting further comprises a means for transmitting movable between an open position and a closed position by said means for controlling and operatively engaged with said means for diverting so that when said means for transmitting is in the open position thereof, the refrigerant flows from the means for compressing fluid to the refrigeration system, and when said means for transmitting is in the closed position thereof the refrigerant is prevented from flowing from the means for compressing fluid to the refrigeration system.

* * * * *